United States Patent
Saha et al.

(10) Patent No.: US 10,169,235 B2
(45) Date of Patent: Jan. 1, 2019

(54) METHODS OF OVERRIDING A RESOURCE RETRY

(71) Applicant: Apple Inc., Cupertino, CA (US)

(72) Inventors: Bikram Saha, Cupertino, CA (US); Harshavardhan Kaushikkar, San Jose, CA (US); Wolfgang H. Klingauf, San Jose, CA (US)

(73) Assignee: Apple Inc., Cupertino, CA (US)

( * ) Notice: Subject to any disclaimer, the term of this patent is extended or adjusted under 35 U.S.C. 154(b) by 134 days.

(21) Appl. No.: 14/969,360

(22) Filed: Dec. 15, 2015

(65) Prior Publication Data

US 2017/0168940 A1 Jun. 15, 2017

(51) Int. Cl.
*G06F 12/084* (2016.01)
*G06F 12/0815* (2016.01)

(52) U.S. Cl.
CPC ........ *G06F 12/0815* (2013.01); *G06F 12/084* (2013.01); *G06F 2212/621* (2013.01)

(58) Field of Classification Search
CPC ............... G06F 12/0815; G06F 12/084; G06F 2212/621
See application file for complete search history.

(56) References Cited

U.S. PATENT DOCUMENTS

| | | | |
|---|---|---|---|
| 5,906,000 A | 5/1999 | Abe | |
| 6,338,125 B1 | 1/2002 | Kopser | |
| 7,624,396 B1 * | 11/2009 | Isenberg | G06F 9/466 719/314 |
| 8,209,493 B2 | 6/2012 | Rotithor | |
| 8,352,689 B2 | 1/2013 | Noeldner | |
| 8,589,934 B2 | 11/2013 | Makljenovic | |
| 8,640,137 B1 * | 1/2014 | Bostic | G06F 9/5072 718/101 |
| 2005/0201402 A1 * | 9/2005 | Dennison | H04L 45/00 370/412 |
| 2010/0114849 A1 * | 5/2010 | Kingsbury | G06F 17/30171 707/704 |
| 2012/0331197 A1 * | 12/2012 | Campbell | G06F 13/1631 710/117 |
| 2014/0245299 A1 * | 8/2014 | Yadappanavar | G06F 9/45533 718/1 |

* cited by examiner

*Primary Examiner* — Ann J Lo
*Assistant Examiner* — Jane Wei
(74) *Attorney, Agent, or Firm* — Meyertons, Hood, Kivlin, Kowert & Goetzel, P.C.

(57) ABSTRACT

In an embodiment, an apparatus includes control circuitry and a memory configured to store a plurality of access instructions. The control circuitry is configured to determine an availability of a resource associated with a given access instruction of the plurality of access instructions. The associated resource is included in a plurality of resources. The control circuitry is also configured to determine a priority level of the given access instruction in response to a determination that the associated resource is unavailable. The control circuit is further configured to add the given access instruction to a subset of the plurality of access instructions in response to a determination that the priority level is greater than a respective priority level of each access instruction in the subset. The control circuit is also configured to remove the given access instruction from the subset in response to a determination that the associated resource is available.

20 Claims, 7 Drawing Sheets

| Request Queue 501 | |
|---|---|
| Mem Req 510 | Priority 511 |
| 510a | 0 |
| 510b | 0 |
| 510c | 1 |
| 510d | 3 |
| 510e | 2 |
| ⋮ | ⋮ |

| Retry Group 503 | |
|---|---|
| Mem Req 510 | Priority 511 |
| 510a | 0 |
| 510c | 1 |
| | 2 |
| 510d | 3 |

METHODS OF OVERRIDING A RESOURCE RETRY

BACKGROUND

Technical Field

Embodiments described herein are related to the field of integrated circuit implementation, and more particularly to the implementation of memory systems.

Description of the Related Art

In a computing system, multiple memory access requests may be queued for processing as the requests are issued. A memory controller may retrieve memory access requests from the queue to process as the memory resources are available. Some of these memory access requests may be processed upon reception if memory resources required to fulfill the memory access request are currently available. A portion of the memory access requests, however, may utilize a resource of the memory system that is currently busy fulfilling a previous processed requests. Requests utilizing unavailable resources may be identified and the memory controller may monitor the unavailable resource(s), and fulfill the corresponding request once the resource(s) is available. This process of identifying (or "tagging") a memory requests and monitoring the unavailable resource is commonly referred to as a "resource retry."

If multiple requests require unavailable resources, then a number of memory requests added to a resource retry queue may grow. As a result, a response time for completing the memory requests may cause noticeable delays or performance lags in the computing system. In addition, a high priority memory request may become stalled behind lower priority memory requests, potentially leading to a stall of a high priority process, such as, for example, processing of an exception, a trap, or an interrupt.

SUMMARY OF THE EMBODIMENTS

Various embodiments of a processor are disclosed. Broadly speaking, a system, an apparatus, and a method are contemplated in which the apparatus includes a memory configured to store a plurality of memory access instructions and control circuitry. The control circuitry is configured to determine an availability of a memory resource associated with a given memory access instruction of the plurality of memory access instructions, wherein the memory resource associated with the given memory access instruction is included in a plurality of memory resources. The control circuit is also configured to determine a priority level of the given memory access instruction in response to a determination that the associated memory resource is unavailable. The control circuit is further configured to add the given memory access instruction to a subset of the plurality of memory access instructions in response to a determination that the priority level is greater than a respective priority level of each memory access instruction in the subset. The control circuit is also configured to remove the given memory access instruction from the subset in response to a determination that the associated memory resource is available.

In a further embodiment, the priority level is included in a predetermined plurality of priority levels. In one embodiment, a number of memory access instructions included in the subset with a given priority level is equal to one. In an embodiment, to determine the priority level of the given memory access instruction, the control circuit is further configured to select the priority level dependent upon a quality of service level associated with the given memory access instruction.

In another embodiment, to remove the given memory access instruction from the subset, the control circuit is further configured to poll each memory resource of the plurality of memory resources in an order corresponding to a respective priority level of each associated memory access instruction in the subset. In one embodiment, to poll each memory resource of the plurality of memory resources, the control circuit is further configured to poll a first memory resource associated with a first memory access instruction with the highest priority level in the subset until the first memory resource is available.

In a further embodiment, to poll each memory resource of the plurality of memory resources, the control circuit is further configured to poll a first memory resource associated with a first memory access instruction with the highest priority level in the subset. The control circuit is further configured to poll a second resource associated with a second memory access instruction with the second highest priority in the subset in response to a determination that the first memory resource remains unavailable.

BRIEF DESCRIPTION OF THE DRAWINGS

The following detailed description makes reference to the accompanying drawings, which are now briefly described.

Figure 1:
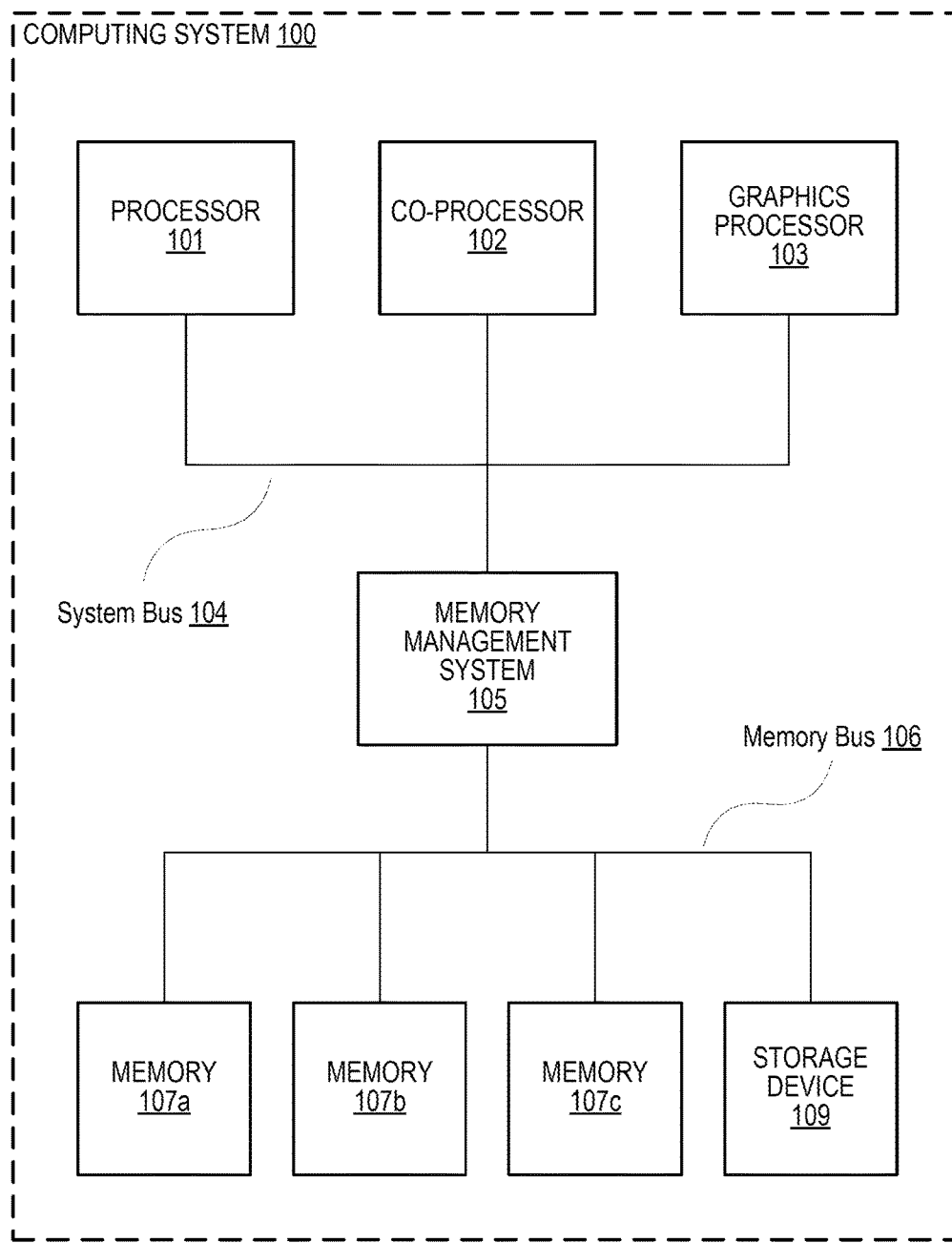
FIG. 1 illustrates a block diagram of an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

Some computing systems allow for queuing of memory requests that are waiting for particular resources to become available, such that a given memory request may be processed as resources become available. Access requests utilizing unavailable resources may be placed into a resource retry group. In such systems, the unavailable resources may be checked or polled for availability in an order that the access request was added to the retry group. As the queue of memory requests grows, performance of the computing system may be degraded if the number of memory requests grows too large. A memory controller may use a round-robin approach to poll the memory requested resources, one-by-one, until one of the requested resources is determined to be available. A high priority access request to a busy memory resource might be stalled if it is overrun with lower priority access requests in the retry group. The high priority access request may have to wait many cycles between polling of its requested resources, thereby delaying processing.

Embodiments of systems and methods for managing a resource retry group are disclosed herein. The disclosed embodiments demonstrate improved methods for adding and prioritizing memory requests to the retry group.

A block diagram of an embodiment of computing system is illustrated in FIG. 1. Computer system 100 includes processor 101, co-processor 102, and graphics processor 103 coupled to memory management system 105, via system bus 104. Memory management system 105 is further coupled to memories 107a-107c, and storage device 109, via memory bus 106.

In various embodiments, processor 101 may be representative of a general-purpose processor that performs computational operations. For example, processor 101 may be a central processing unit (CPU) such as a microprocessor, a microcontroller, a digital signal processor, an application-specific integrated circuit (ASIC), or a field-programmable gate array (FPGA). Although a single processor, i.e., processor 101, is illustrated, some embodiments of system 100 may include any suitable number of processors. Further, in some embodiments, processor 101 may correspond to a processing core complex including one or more processors or processing cores. In various embodiments, processor 101 may implement any suitable instruction set architecture (ISA), such as, e.g., ARM™, C6000™, Blackfin®, or x86 ISAs, or combination thereof. Processor 101 may execute instructions stored in a memory of computing system 100, such as, memories 107a-107c or storage device 109. Some or all of these instructions may be cached in one or more cache memories within computing system 100. In some embodiments, processor 101 may include one or more local cache memories.

Co-processor 102 may include circuitry for offloading some tasks from processor 101. For example, in various embodiments, co-processor 102 may correspond to a floating point unit, a cryptography unit, a security processor, a direct memory access (DMA), or any other suitable co-processing unit. In some embodiments, co-processor 102 may receive commands from processor 101 to perform appropriate tasks, while in other embodiments, co-processor 102 may execute instructions from a memory within computing system 100, such as, for example, memories 107a-107c or storage device 109.

Graphics processor 103 may include circuitry for processing images or video to be sent to a display screen. In some embodiments, images to be processed by graphics processor 103 may be stored in memories 107a-107c and/or storage device 109. In other embodiments, memories 107a-107c and/or storage device 109 may store instructions for use by graphics processor 103 to generate images.

Memory management system 105 includes circuits for managing memory requests from processor 101, co-processor 102, and graphics processor 103. In the illustrated embodiment, memory management system 105 decodes memory requests, translates addresses, and determines a location for fulfilling the memory requests. Memory management system 105 includes interfaces for communicating with memories 107a-107c and storage device 109. Memory requests from any of processor 101, co-processor 102, and graphics processor 103 may include virtual addresses. Memory management system 105 translates virtual addresses into intermediate or physical addresses depending on a determined location of the address. Memory management system may also include one or more cache memories to provide faster access to frequently used memory addresses and/or speculative fetching of additional memory locations dependent upon a requested address. In some embodiments, memory management system 105 may also include a request queue. For storing memory requests until the memory request can be fulfilled. A further embodiment of a memory management system will be discussed in more detail below.

Memories 107a-107c and mass-storage device 109 are storage devices that collectively form a memory hierarchy that stores data and instructions for computing system 100. More particularly, the mass-storage device 109 may be a high-capacity, non-volatile memory, such as a disk drive or a large flash memory unit with a long access time, while memories 107a-107c may correspond to volatile memory with shorter access times. Memories 107a-107c may be representative of memory devices in the dynamic random access memory (DRAM) family of memory devices or in the static random access memory (SRAM) family of memory devices, or in some embodiments, a combination thereof. Each of memories 107a-107c and storage device 109 may include respective memory controllers, while, in other embodiments, any or all may correspond to unmanaged memory devices controlled from within memory management system 105.

It is also noted that, to improve clarity and to aid in demonstrating the disclosed concepts, the diagram of computer system 100 illustrated in FIG. 1 has been simplified. In other embodiments, different and/or additional circuit blocks and different configurations of the circuit blocks are possible and contemplated.

Figure 2:
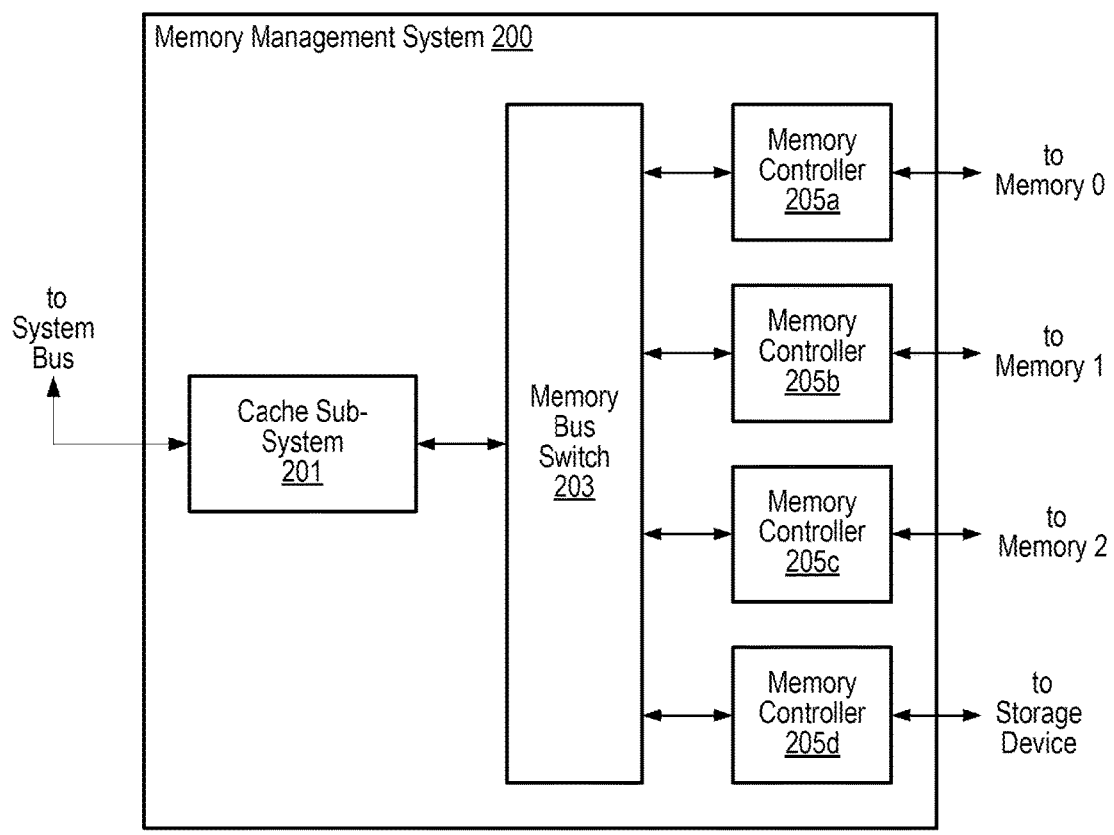
FIG. 2 illustrates a block diagram of an embodiment of a memory sub-system.

Turning to FIG. 2, a block diagram illustrating an embodiment of a memory management system is shown. In some embodiments, memory management system 200 may correspond to memory management system 105 of FIG. 1. Memory management system 200 includes cache sub-system 201 coupled to memory bus switch 203. Memory bus switch 203 is coupled to memory controllers 205a-205d. Each of memory controllers 205a-205c are coupled to a respective one of multiple memories, such as, for example, memories 107a-107c. Memory controller 205d is coupled to a storage device, such as, e.g., storage device 109.

In the illustrated embodiment, cache sub-system 201 is coupled to a system bus from which memory requests may be received. Memory requests may be received from any processor in the system, such as, for example, processor 101, co-processor 102, and graphics processor 103 as illustrated in FIG. 1. Cache sub-system 201 may provide faster fulfillment of memory requests by storing frequently used instructions and data. After receiving a memory request, cache sub-system 201 determines if the memory request corresponds to a read command or a write command, and if an address included in the memory request corresponds to an address currently stored in cache sub-system 201. If the memory request is a read and the corresponding address is currently stored in cache sub-system 201, then cache sub-system 201 fulfills the memory request by returning a local copy of requested data. Otherwise, if the memory request is a read but a copy of data stored at the requested address is not currently stored in cache sub-system 201, then cache sub-system 201 issues a request for data at the address included in the memory request, via memory bus switch 203 and one or more of memory controllers 205a-205d. Similarly, if the memory request corresponds to a write command, then cache sub-system 201 may issue a request to write the corresponding data to the one or more memories and/or the storage device.

Memory requests received by cache sub-system 201 may include a priority indicating an urgency, relative to other memory requests, for fulfilling the corresponding memory request. These priorities may indicate a level of quality of service (QoS) related to the memory requests. For example, a read request issued by processor 101 that fetches an instruction included in an exception process may have a highest QoS level since an exception may need to be executed as quickly as possible. Instruction fetches associated with trap and interrupt processes may also have a highest QoS level, or may be a second highest QoS level to allow exception handling to override the trap or interrupt. A third highest QoS level may be used by memory requests issued by graphics processor 103 when fetching data for a display buffer. A default or normal QoS level may be used for general data and instruction fetches. In the embodiments disclosed herein, four QoS levels are used, although it is noted that in other embodiments, any suitable number of QoS levels may be employed.

In some embodiments, if a memory request does not include a QoS level Cache sub-system 201 may add a QoS level, or may modify an included QoS level depending upon the status of the memory location related to the memory request. For example, if a write command is received for a memory location that is currently stored in cache sub-system 201 and is also shared with another cache (not shown), then cache sub-system 201 may use a higher QoS level for writing the new data to a corresponding memory location such that the other cache may have access to the new data sooner.

Memory bus switch 203 couples cache 201 to each of memory controllers 205a-205d. In some embodiments, memory bus switch 203 may include circuitry and a translation table for mapping respective address ranges to each of memory controllers 205a-205d. Memory bus switch 203 may also support accessing two or more memory controllers concurrently. For example, to improve memory access times, data may be read and written from/to memories 0-2 in parallel through memory controllers 205a-205c.

In the present embodiment, memory controllers 205a-205d manage data read and write commands to each respective memory. Memory controller 205a is coupled to memory 0, memory controller 205b is coupled to memory 1, memory controller 205c is coupled to memory 2, and memory controller 205d is coupled to the storage device. Memories 0-2 may correspond to DRAM or SRAM, and storage device may correspond to non-volatile memory such as flash memory or a hard-disk drive (HDD). Memories 0-2 and/or the storage device may managed or unmanaged devices. In various embodiments, memories 0-2 and/or the storage device may be incorporated on a same chip or die as memory management system 200. Alternatively, memories 0-2 may be included on a different chip or die than memory subsystem, and may be co-packaged in a same physical chip package or individually packaged chips.

Memory controllers 205a-205d perform tasks associated with reading, writing, and maintaining data in each respective memory. If the respective memory is unmanaged, then the corresponding memory controller 205 performs all tasks from low-level read and write commands to higher level tasks such as, for example, address translation, garbage collection, wear levelling, bad-block management, and the like. If the respective memory is managed, then the respective memory controller 205 may not perform lower level tasks and some or all of the higher level tasks. When a given memory controller of memory controllers 205a-d is performing some tasks, it may not be able to receive new commands from cache sub-system 201. In such cases, circuitry in cache sub-system 201 may monitor the given memory controller 205 to determine when the given memory controller is available and then retry the memory command.

It is noted that the embodiment of memory management system 200 as illustrated in FIG. 2 is merely an example. The illustration of FIG. 2 has been simplified to highlight features relevant to this disclosure. Various embodiments may include different configurations of the circuit blocks, including additional circuit blocks, such as, additional memory controller, for example. Although a single cache sub-system 201 is shown, in other embodiments, multiple cache memories may be included.

Figure 3:
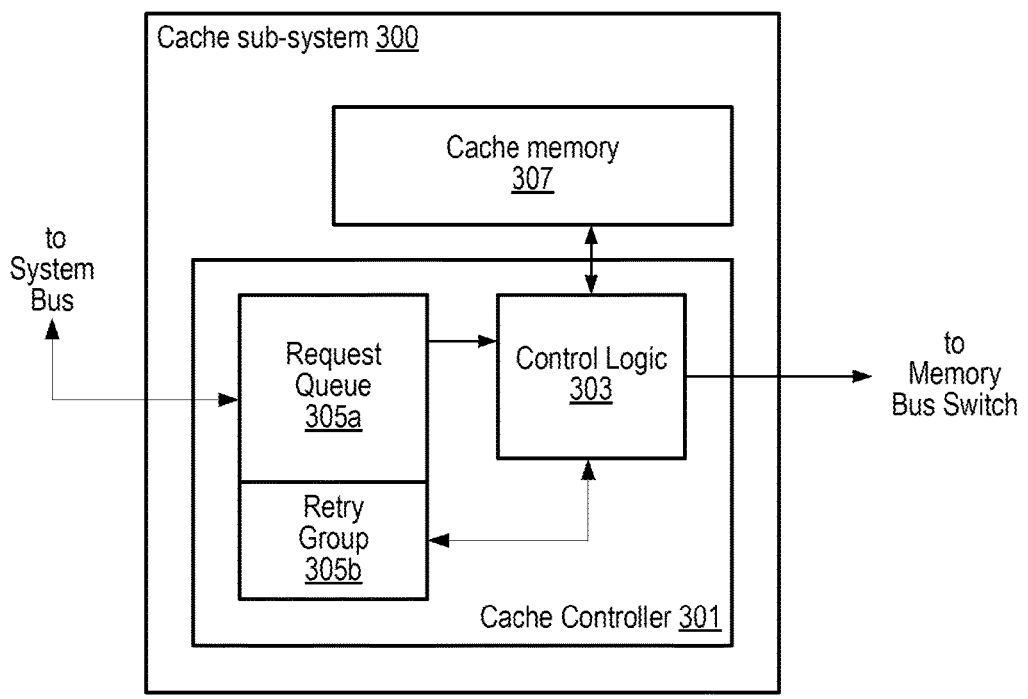
FIG. 3 shows a block diagram of a cache sub-system.

Moving to FIG. 3, a block diagram of a cache sub-system is illustrated. In the illustrated embodiment, cache sub-system 300 corresponds to cache sub-system 201 in FIG. 2. Cache sub-system 300 includes cache controller 301, which in turn, includes control logic 303, coupled to retry group 305b. Control logic 303 is also coupled to cache memory 307, and request queue 305a. Referring to the embodiment of computing system 100 in FIG. 1, cache 300 is a part of memory management system 105 and is used to store instructions and data from any of memories 107a-107c and storage device 109 for use by any of processor 101, co-processor 102, and graphics processor 103.

Memory requests issued by various processors in FIG. 1 (e.g., processor 101, co-processor 102, and graphics processor 103) may be received via a system bus and stored in request queue 305a. Cache controller 301 retrieves a memory request from request queue 305a and determines a type of memory command, and a corresponding address, for each memory request stored in request queue 305a. Control logic 303 decodes at least a portion of the address, and determines if data corresponding to the address is currently stored in cache memory 307. In some embodiments, control logic 303 also determines if the corresponding data is valid. As referred to herein, "valid" data refers to cached data whose value corresponds to a value of the data in the corresponding memory location. For example, cached data may be invalidated if a value of the data in the original memory location is modified without the cached data value being modified accordingly. If the data corresponding to the address is stored in cache memory 307 and is valid, then control logic 303 executes the memory command using values in the corresponding location in cache memory 307. Otherwise, control logic 303 attempts to execute the memory command using values from the corresponding location in system memory (e.g., memories 107a-107c, or storage device 109).

As part of the attempt to execute the memory command, control logic 303 determines the path to the system memory location that corresponds to the address of the command, and if resources in this determined path are available for executing the command. For example, referring to FIG. 2, if the address corresponds to a memory location in memory 1, then memory controller 205b is a resource in the path. If resources are available, then the command is executed via a memory bus switch. Otherwise, if a resource is not available, control logic 303 places the command in retry group 305b. Retry group 305b holds a limited number of memory commands that are waiting for resources to become available. In the present embodiment, retry group 305b holds up to one memory command for each of the four QoS levels previously described. A portion of control logic 303 may continue to retrieve memory requests from request queue 305a and execute the corresponding memory commands if the memory resources in the respective address paths are available. Another portion of control logic 303 monitors or polls previously identified busy resources to determine if these resources have become available. If a previously unavailable resource becomes available, then control logic 303 executes a command from retry group 305b that is waiting for the unavailable resource to become available.

Retry group 305b includes one entry corresponding to each of the four QoS levels. To add a memory command to retry group 305b, control logic 303 determines if the entry in retry group 305b with the QoS level corresponding to the QoS level of the memory command is empty. If the entry is empty, then the memory command is added. Otherwise, the memory command remains in request queue 305a to be retrieved later.

It is noted that although retry group 305b is illustrated as a separate block from request queue 305a, in some embodiments, retry group 305b may be incorporated within request queue 305a. For example, instead of copying a given command from request queue 305a into a separate memory, the given command may be tagged within request queue 305a using one or more data bits to indicate that the given command is included in retry group 305b.

It is further noted that the tables in FIG. 3 merely illustrates an example of a cache system. Various other embodiments may include different circuit blocks. FIG. 3 is not intended to illustrate a physical arrangement or relative sizes of the illustrated circuit blocks.

Figure 4:
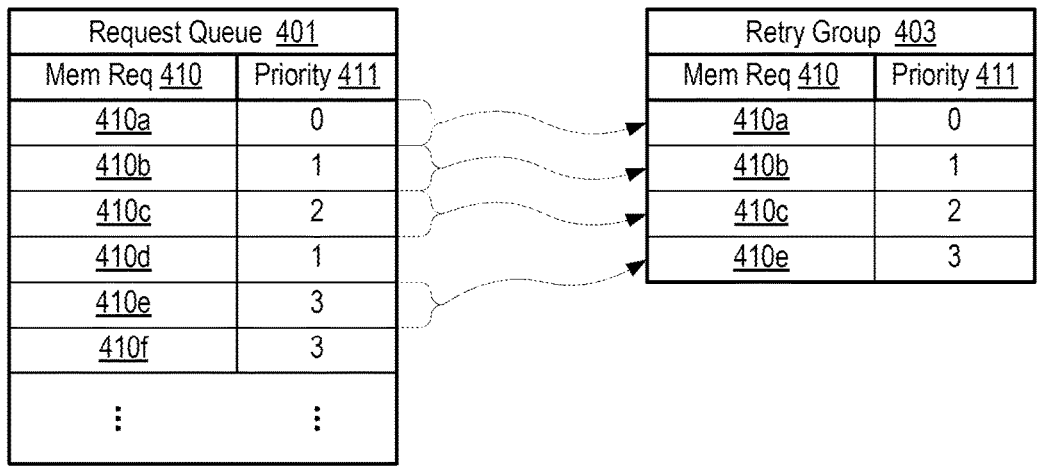
FIG. 4 illustrates a diagram of tables representing an embodiment of memory requests in a queue and a progression of the memory requests into a retry group.

Turning now to FIG. 4, a diagram of tables representing an embodiment of memory requests in a queue and a progression of the memory requests into a retry group is illustrated. FIG. 4 includes two tables, request queue 401 and retry group 403. In the present embodiment, request queue 401 corresponds to request queue 305a and retry group 403 corresponds to retry group 305b in FIG. 3.

Request queue 401 includes two columns: memory request (mem req) 410 corresponding to memory requests received via a system bus, and priority 411 corresponding to a QoS level assigned to the respective memory request 410, with a value of 0 representing the lowest priority, up to a value of 3 representing the highest priority. Request queue 401 is shown holding six requests, memory requests 410a-410f, with each memory request 410a-410f including a respective priority. In the current example, memory requests 410a-410f are received in order, from memory request 410a received first, to memory request 410f received last.

Retry group 403 includes two corresponding columns for memory request 410 and priority 411. In the present embodiment, retry group 403 includes four entries, one corresponding to each of the four priorities, 0-3. For the following example, retry group 403 starts with no memory requests in the memory request 410 column, and all six memory requests 410 include unavailable resources in the paths to their respective system memory addresses.

Referring to cache 300 of FIG. 3, control logic 303 retrieves memory request 410a and determines that at least one resource in the path to the respective memory location is unavailable. Control logic 303 then determines the priority level is 0 and that the corresponding priority 0 entry is empty. Control logic 303 adds memory request 410a to retry group 403, either by copying memory request 410a into separate memory used as retry group 403 or by tagging memory request 410a in request queue 401 to indicate that memory request 410a has taken the priority 0 entry.

Control logic 303 retrieves memory request 410b next, and determines that it also uses unavailable resources (in various embodiments, memory request 410b may use the same or different resources as memory request 410a). The respective priority 411 is determined to be 1 and control logic 303 determines that the priority 1 entry in retry group 403 is available. Accordingly, memory request 410b is added to the priority 1 entry. Next, control logic 303 retrieves memory request 410c with priority 2. Again, control logic 303 determines that unavailable resources are needed and that the corresponding priority 2 entry is empty. Memory request 410c is added to the priority 2 entry in retry group 403.

The next request is memory request 410 with priority 1. Memory request 410d also uses unavailable resources, but since the priority 1 entry is occupied by memory request 410b, memory request 410d is not added to retry group 403. Memory request 410d remains in request queue 401 to be retrieved again later.

Memory request 410e with priority 3 is retrieved next. The retry group 403 entry corresponding to priority 3 is empty and control logic 303 can, therefore, add memory request 410e to the respective priority 3 entry. Retry group 403 is now full. Memory request 410f cannot be added to retry group 403, despite having a priority of 3, until memory request 410e has been fulfilled. It is noted that memory requests 410d or 410f may be fulfilled after their initial retrieval if their respective paths did not include unavailable resources.

It is also noted that the tables of FIG. 4 are merely examples. Tables 401 and 403 are logical representations of a request queue and retry group, respectively. The illustrated tables are not intended to represent physical arrangements of data included a request queue or a retry group. Other embodiments may include any number of columns to include any suitable information related to a given memory request, such as memory commands, addresses, data, or additional tags used to fulfill the given memory request.

Figure 5:
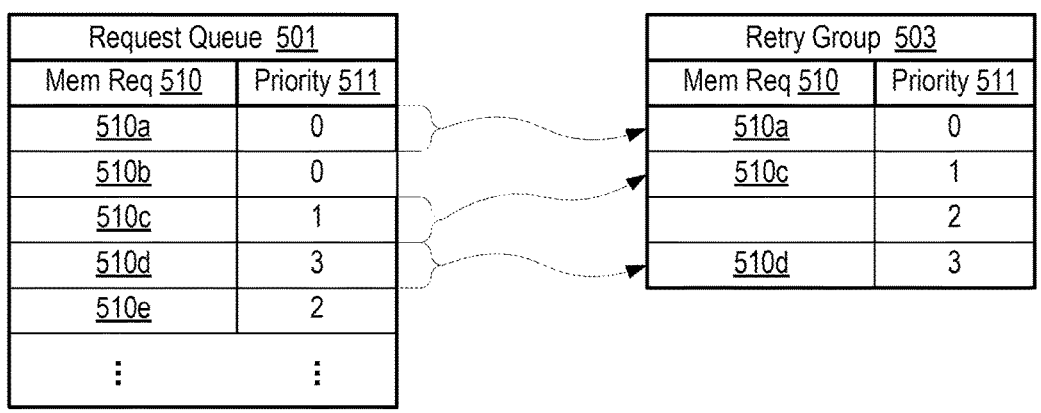
FIG. 5 illustrates a diagram of tables representing another embodiment of memory requests in a queue and a progression of the memory requests into a retry group.

Moving now to FIG. 5, a diagram of tables representing another embodiment of memory requests in a queue and a progression of the memory requests into a retry group is presented. In the illustrated embodiment, FIG. 5 includes two tables, request queue 501 corresponding to request queue 401, and retry group 503 corresponding to retry group 403. Referring collectively to cache sub-system 300 of FIG. 3 and the tables depicted in FIG. 5, the following example begins with memory requests 510 received in order from 510a first through 510e last, and with all four entries of retry group 503 empty. All memory request 510 use unavailable resources for this example.

Control logic 303 retrieves memory request 510a with priority 0. Since all entries of retry group 503 are empty, memory request 510a is added to the priority 0 entry. Control logic 303 retrieves memory request 510b, also with priority 0. Since the priority 0 entry is occupied, memory request 510b is not added to retry group 503, and instead, remains in request queue 501. Memory request 510c is retrieved with priority 1. The priority 1 entry in retry group 503 is empty, so memory request 510c is added.

Control logic 303 then retrieves memory request 510d with priority 3. The priority 3 entry is empty, so memory request 510d is added accordingly. Control logic 303 retrieves memory request 510e next. Memory request 510e has priority 2, and the priority 2 entry in retry group 503 is empty. In the current embodiment, however, a memory request 510 cannot be added if a higher priority memory request 510 is currently in retry group 503. Since memory request 510d occupies the priority 3 entry, the priority 2 entry cannot be occupied until memory request 510d has been fulfilled and removed from retry group 503. Memory request 510e, therefore, remains in request queue 501.

It is noted that the tables of FIG. 5 are examples for demonstrating the disclosed embodiments. Similar to FIG. 4, tables 501 and 503 are logical representations of a request queue and retry group, respectively. Although the tables of FIG. 5 show two columns each, any suitable number of columns may be included in other embodiments, such as, for example, memory commands, addresses, data, or additional tags. Although four priorities are shown, any suitable number of priorities may be included. In addition, retry group 503 may include more than one entry for any of the priority levels.

Figure 6:
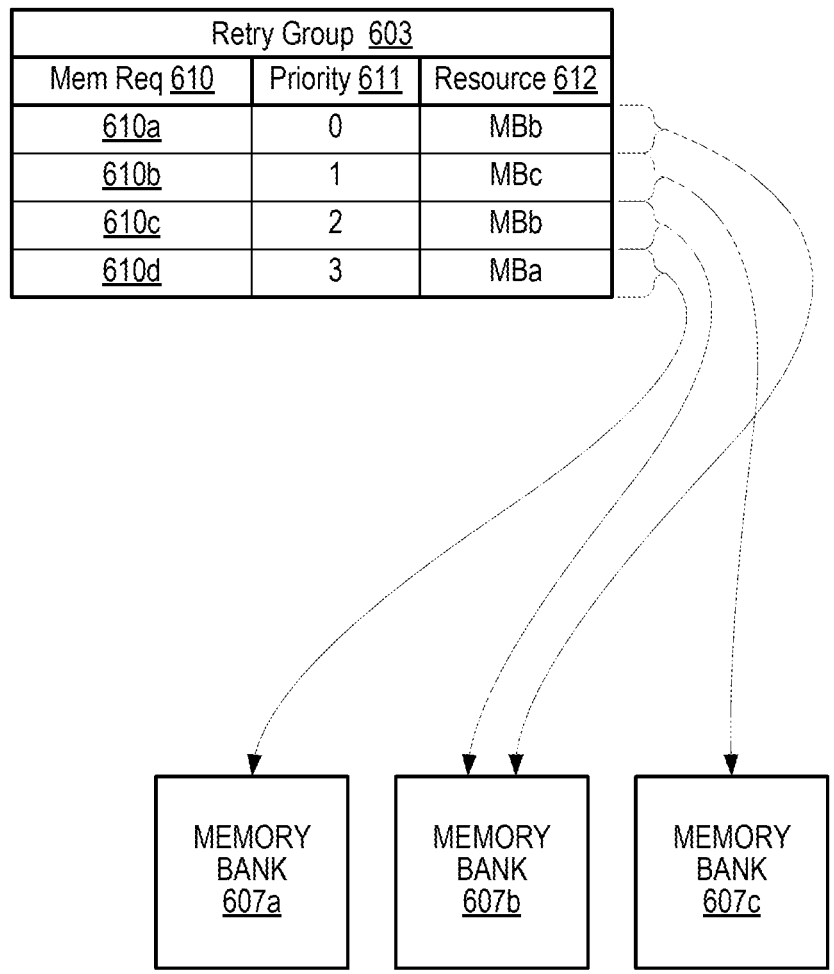
FIG. 6 shows a diagram of a table representing an embodiment of a retry group.

Turning to FIG. 6, a diagram of a table representing an embodiment of a retry group is shown. In the illustrated embodiment, retry group 603 corresponds to retry group 305b in FIG. 3. Retry group 603 is similar to retry groups 403 and 503 in FIGS. 4 and 5, respectively. Columns memory request (mem req) 610 and priority 611 correspond to the similarly named and numbered columns in FIG. 4 and FIG. 5. The third column, resource 612, indicates a corresponding memory resource to be used by each memory request. Memories 607a-607c are show as three example memory resources.

In the present example, retry group holds memory requests 610a-610c with respective priorities from 0 to 3. Memory requests 610a and 610c each address a location in memory 607b. Memory request 610b addresses a location in memory 607c and memory request 610d addresses a location in memory 607a. Memory requests 610 have been received in order from memory request 610a to memory request 610d. Cache controller 301 polls the memory resources indicated by resources 612 until a polled resource becomes available for use. Several methods for determining which resource to poll are disclosed herein.

In a first embodiment, control logic 303 begins with the resource 612 (or resources if more than one are unavailable) to be used by the highest priority memory requests is polled first, e.g., memory 607a for memory request 610d. After polling, if memory 607a remains unavailable, then the resource to be used by the next highest priority memory request (610c) is polled (memory 607b). The method continues until a memory resource associated with each memory request 610 in retry group 603 has been polled, at which point control logic 303 restarts with the highest priority memory request (610d).

In a second embodiment, the process for polling memory resources may be similar to the first embodiment. For example, control logic 303 begins by polling the resource 612 corresponding to the highest priority memory request (610d), e.g., memory 607a. Upon determining memory 607a remains unavailable, control logic 303 polls the resource for the second highest priority request (memory request 610c). Control logic 303 determines memory 607b remains unavailable and moves to the next highest priority memory request (610b). Upon determining memory 607c remains unavailable, control logic 303 determines that the next memory request (610a) is waiting on the same resource (memory 607b) as memory request 610c. Since memory request 610c has a higher priority than memory request 610a, control logic 303 skips polling memory 607b a second time and instead returns to polling memory 607a for memory request 610d.

In a third embodiment, control logic 303 again begins by polling memory 607a which corresponds to the highest priority memory request (610d). If control logic 303 determines that memory 607a remains unavailable, the control logic 303 continues to poll memory 607a until it becomes available. In this embodiment, control logic 303 does not poll a next resource until the resource for the memory request with the current highest priority is determined to be available. After memory 607a becomes available and memory request 610d starts to be processed, control logic 303 starts to poll memory 607b for memory request 610c.

It is noted that FIG. 6 is merely an example. Although memories 607a-607c are used as examples of memory resources, any logic, circuits, buffers, etc., that are used to fulfill memory requests are also examples of memory resources. In addition, methods other than polling a resource are known and contemplated for use.

Figure 7:
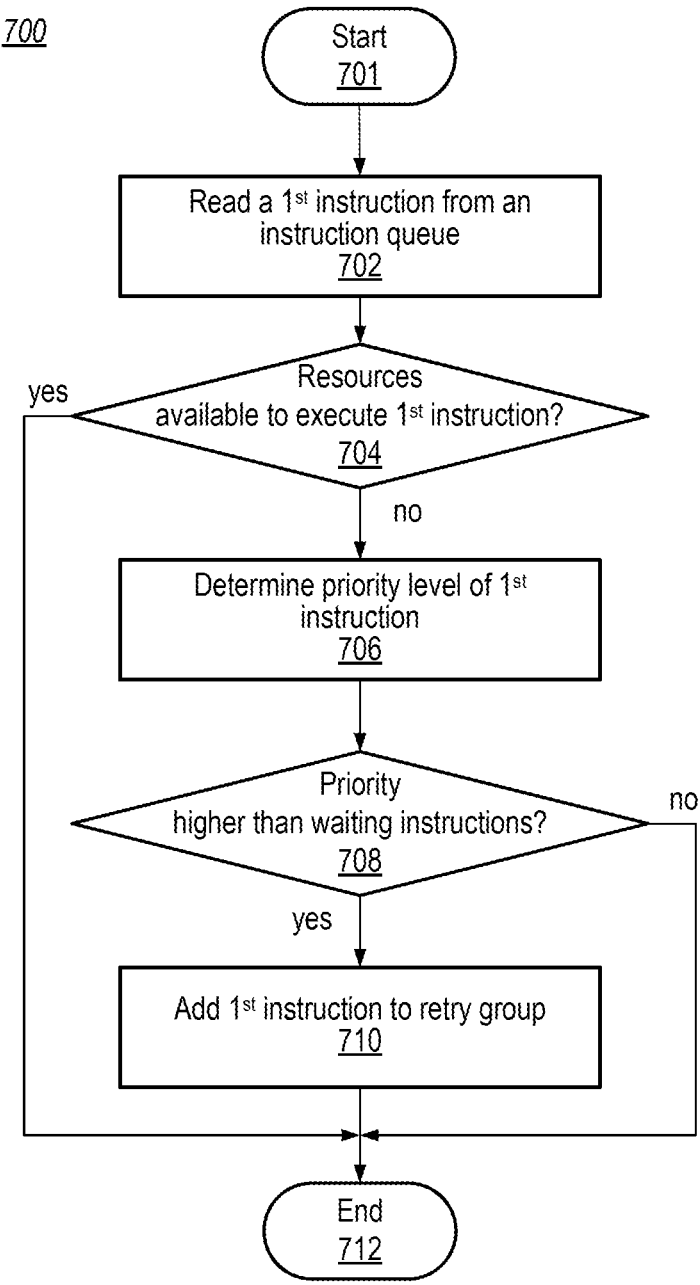
FIG. 7 illustrates a flow diagram of an embodiment of a method for selecting an instruction for entry into a retry group.

Moving to FIG. 7, a flow diagram of an embodiment of a method for selecting an instruction for entry into a retry group is illustrated. Method 700 may be applied to a memory controller, such as, for example, cache controller 301 in FIG. 3. Referring collectively to FIG. 3 and the flow diagram of FIG. 7, the method begins in block 701.

A first instruction is read from an instruction queue (block 702). In various embodiments, the instruction queue may correspond to a memory request queue in a memory controller or cache controller. The first instruction may correspond to a memory request or a memory command issued by a processor in a computing system. In the present embodiment, the instruction queue corresponds to request queue 305a. The first instruction corresponds to a request to access a memory location in a computing system, such as, for example, computing system 100 in FIG. 1. The memory request includes one or more commands and at least one address of a memory location on which to process the one or more commands.

Further operation of the method may depend upon an availability of a resource to be used to process the first instruction (block 704). A circuit, such as, for example, control logic 303, identifies resources to be used to process the first instruction and then determines if these resources are currently available. If the identified resources are available, then the method ends in block 712 and the first instruction is processed. Otherwise, if at least one of the identified resources is unavailable, the method moves to block 706 to determine a priority level.

A priority level of the first instruction is determined (block 706). In some embodiments, instructions in request queue 305a include an assigned priority level. In other embodiments, a priority level may be assigned to instructions as they are retrieved from request queue 305a. A priority level may be assigned dependent upon, for example, which processor issued the instruction, which resources are targeted for use by the instruction, by a status of computing system 100 when the instruction was issued, to which software process the instruction belongs, or a combination thereof. In the present embodiment, a predefined number of priority levels are used. Any suitable number of priority levels may be used. For example, an embodiment may include two priority levels, corresponding to a high priority and a low priority. Other embodiments may include any number of priorities between a highest and lowest priority.

Continuing operation of the method may depend upon the priority level of the first instruction (block 708). The priority level of the first instruction is compared to the priority level of other instructions currently waiting in a resource retry group, such as, for example, retry group 305b. If the priority level of the first instruction is higher than the priority level of instructions currently in retry group 305b, then the method moves to block 710 to add the first instruction to retry group 305b. Otherwise, if the first instruction has a priority level equal to or lower than any instruction currently in retry group 305b, the first instruction is left in resource queue 305a as is and the method ends in block 712.

In response to determining that the priority level of the first instruction is higher than the priority level of other instructions in retry group 305b, the first instruction is added to retry group 305b (block 710). In the current embodiment, control logic 303 assigns up to one instruction for each priority level into retry group 305b. In other embodiments, however, any suitable number of instructions may be added to retry group 305b for each priority level. For example, an embodiment of a retry group with three levels of priority may include one instruction with the lowest priority, two instructions with the middle priority, and three instructions with the highest priority.

In the present embodiment, to add the first instruction to retry group 305b, control logic 303 sets a value of one or more bits corresponding to the entry of the first instruction in request queue 305a. This setting of bits is referred to herein as "tagging" an instruction. The value indicates to control logic 303 that the corresponding instruction is currently included in retry group 305b and may additionally include information indicating one or more unavailable resources to be used by the first instruction. In other embodiments, retry group 305b may include register bits or other type of memory with an entry for each instruction that can be held in retry group 305b. For example, a given retry group may include four entries, one per each of four priority levels. Each of the four entries may include information corresponding to the corresponding instruction, such as, e.g., an index to the instruction in the request queue, an indication of the unavailable resource, a decoded address included in the instruction, and the like. Once the first instruction has been added to retry group 305b, the method ends in block 712.

It is noted that the method illustrated in FIG. 7 is merely an example embodiment. Variations on this method are possible. Some operations may be performed in a different sequence, and/or additional operations may be included.

Figure 8:
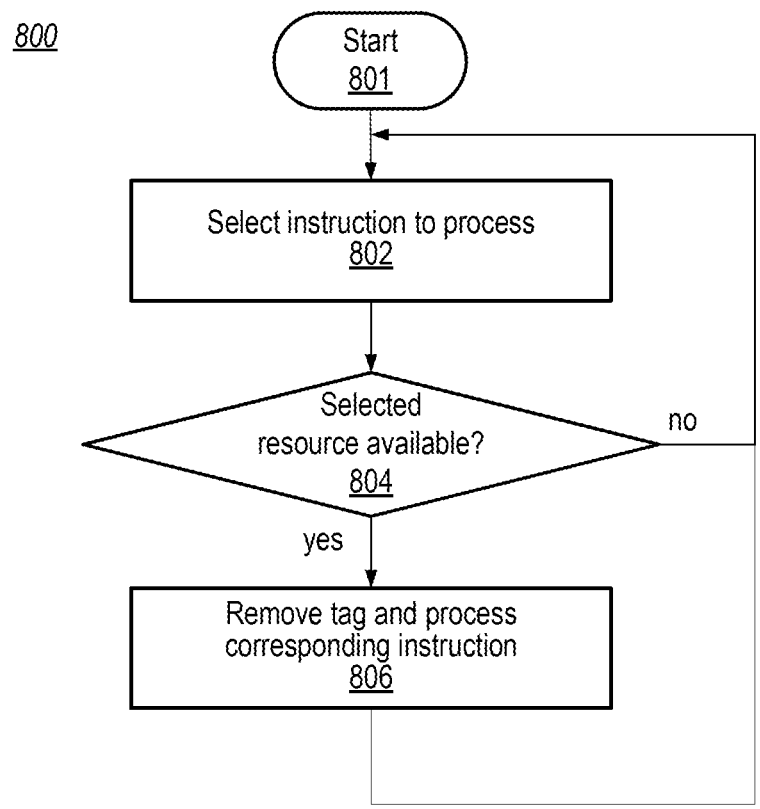
FIG. 8 shows a flow diagram illustrating an embodiment of a method for selecting a resource to monitor.

Turning now to FIG. 8, a flow diagram illustrating an embodiment of a method for selecting a resource to monitor is shown. Method 800 may be applied to a memory controller, such as, for example, cache controller 301 in FIG. 3, and may run concurrently with method 700 in FIG. 7. Referring collectively to FIG. 3 and the flow diagram of FIG. 8, the method may begin in block 801.

An instruction is selected to be processed (block 802). In the present embodiment, a logic circuit, such as, for example, control logic 303, selects an instruction from a retry group, such as retry group 305b, to process. Processing of the instruction begins by determining if a resource previously determined to be unavailable has become available. In some embodiments, control logic 303 selects the instruction in retry group 305b with the highest priority, and continues to select the instruction with the highest priority until the corresponding resource is determined to be available. In other embodiments, control logic 303 selects the instruction in retry group 305b with a next highest priority from a last selected instruction. For example, retry group 305b may include four entries corresponding to four priority levels, with 3 being the highest priority and 0 being the lowest. If control logic 303 selected the instruction with priority level 3 at a last selection operation, then control logic 303 selects the instruction corresponding to priority level 2 from retry group 305b.

Further operation of the method may depend upon an availability of a resource to be used by the selected instruction (block 804). Control logic 303 identifies one or more previously unavailable resources to be used by the selected instruction and determines if the one or more resources are available. If all resources are available for the instruction, then the method moves to block 806 to process the instruction. Otherwise, the method returns to block 802 to select a next instruction to process.

If resources have been determined to be available, then the selected instruction is processed (block 806). In the current embodiment, processing the instruction may include executing one or more memory commands, such as, for example, reading or writing data from an address included in the instruction. In addition to processing the instruction, tags that had been set to indicate that the selected instruction was in the retry group are cleared, thereby removing the instruction from retry group 305b. In other embodiments, an entry corresponding to the priority level of the selected instruction may be cleared to remove the instruction from retry group 305b. The method moves back to block 802 to select a next instruction to process.

It is noted that the method illustrated in FIG. 8 is an example for demonstrating the disclosed concepts. In other embodiments, operations may be performed in a different sequence. Additional operations may also be included.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a memory configured to implement a first queue and a second queue, wherein the first queue has a plurality of entries, each configured to store a memory access instruction having one of a set of priority levels, wherein the second queue has fewer entries than the first queue, and wherein each entry in the second queue corresponds to one of the set of priority levels; and
   a control circuit configured to:
      determine an availability of a memory resource associated with a given memory access instruction, wherein the memory resource associated with the given memory access instruction is included in a plurality of memory resources;
      determine a particular priority level of the given memory access instruction in response to a determination that the memory resource associated with the given memory access instruction is unavailable; and
      add the given memory access instruction to the second queue in response to a determination that an entry in the second queue corresponding to the particular priority level is available, and that the particular priority level is greater than a respective priority level of each memory access instruction currently in the second queue.

2. The apparatus of claim 1, wherein the control circuit is further configured to exclude the given memory access instruction from the second queue in response to a determination that another memory access instruction with the particular priority level is currently included in the second queue.

3. The apparatus of claim 1, wherein to add the given memory access instruction to the second queue, the control circuit is further configured to set one or more data bits of a corresponding entry in the first queue to a value indicating that the given memory access instruction is included in the second queue.

4. The apparatus of claim 1, wherein to determine the particular priority level of the given memory access instruction, the control circuit is further configured to select the particular priority level dependent upon a quality of service level associated with the given memory access instruction.

5. The apparatus of claim 1, wherein the control circuit is further configured to:
   poll each memory resource of the plurality of memory resources in an order corresponding to a respective priority level of each associated memory access instruction in the second queue; and
   remove the given memory access instruction from the second queue in response to a determination that the memory resource associated with the given memory access instruction is available.

6. The apparatus of claim 5, wherein to poll each memory resource of the plurality of memory resources, the control circuit is further configured to poll a first memory resource associated with a first memory access instruction with a highest priority level in the second queue until the first memory resource is available.

7. The apparatus of claim 5, wherein to poll each memory resource of the plurality of memory resources, the control circuit is further configured to:
   poll a first memory resource associated with a first memory access instruction with a highest priority level in the second queue; and
   poll a second resource associated with a second memory access instruction with a second highest priority level in the second queue in response to a determination that the first memory resource remains unavailable.

8. A method, comprising:
   storing, in a first queue in a memory, a plurality of instructions, each having one of a set of priority levels;
   determining an availability of a resource associated with a given instruction of the plurality of instructions, wherein the resource associated with the given instruction is included in a plurality of resources;
   determining a particular priority level of the given instruction in response to determining that the resource associated with the given instruction is unavailable; and
   adding the given instruction to a second queue in the memory in response to determining that an entry in the second queue that corresponds to the particular priority level is available, and that the particular priority level of the given instruction is greater than a respective priority level of each instruction currently in the second queue;
   wherein the second queue has fewer entries than the first queue and wherein each entry in the second queue corresponds to one of the set of priority levels.

9. The method of claim 8, further comprising excluding the given instruction from the second queue in response to a determination that another instruction with the particular priority level is currently included in the second queue.

10. The method of claim 9, wherein adding the given instruction to the second queue of the plurality of instructions comprises setting one or more data bits associated with the given instruction in the first queue to a value indicating that the given instruction is included in the second queue.

11. The method of claim 8, wherein determining the particular priority level of the given instruction further comprises selecting the particular priority level dependent upon a quality of service level associated with the given instruction.

12. The method of claim 8, further comprising:
   polling each resource of the plurality of resources in an order corresponding to a respective priority level of each associated instruction in the second queue; and
   removing the given instruction from the second queue in response to a determination that the resource associated with the given instruction is available.

13. The method of claim 12, wherein polling each resource of the plurality of resources further comprises polling a first resource associated with a first instruction with a highest priority level in the second queue until the first resource is available.

14. The method of claim 12, wherein polling each resource of the plurality of resources further comprises:
  polling a first resource associated with a first instruction in the second queue with a highest priority level; and
  polling a second resource associated with a second instruction in the second queue with a second highest priority level in response to determining that the first resource remains unavailable.

15. A system, comprising:
  a memory system;
  at least one processor configured to generate a plurality of access commands for the memory system; and
  a memory controller circuit configured to:
    store the plurality of access commands in a request queue in a buffer, wherein each access command has a corresponding one of a set of priority levels, wherein a number of priority levels in the set is less than a number of entries in the request queue;
    determine an availability of a resource associated with a given access command of the plurality of access commands, wherein the resource associated with the given access command is included in a plurality of resources;
    determine a particular priority level of the given access command, in response to a determination that the resource associated with the given access command is unavailable; and
    add the given access command to a retry queue in the buffer in response to a determination that an entry in the retry queue that corresponds to the particular priority level is available, and that the particular priority level of the given access command is greater than a respective priority level of each access command in the retry queue
  wherein the retry queue has fewer entries than the request queue and wherein each entry in the retry queue corresponds to one of the set of priority levels.

16. The system of claim 15, wherein to add the given access command to the retry queue, the memory controller circuit is further configured to set one or more data bits of the buffer to a value indicating that the given access command is included in the retry queue.

17. The system of claim 15, wherein to determine the particular priority level of the given access command, the memory controller circuit is further configured to select the particular priority level dependent upon a quality of service level associated with the given access command.

18. The system of claim 15, wherein the memory controller circuit is further configured to:
  poll each resource of the plurality of resources in an order corresponding to a respective priority level of each associated access command in the retry queue; and
  remove the given access command from the retry queue in response to a determination that the resource associated with the given access command is currently available.

19. The system of claim 18, wherein to poll each resource of the plurality of resources, the memory controller circuit is further configured to poll a first resource associated with a first access command with a highest priority level in the retry queue until the first resource is available.

20. The system of claim 18, wherein to poll each resource of the plurality of resources, the memory controller circuit is further configured to:
  poll a first resource associated with a first access command with a highest priority level in the retry queue; and
  poll a second resource associated with a second access command with a second highest priority level in the retry queue in response to a determination that the first resource remains unavailable.

* * * * *